United States Patent [19]

Vinciarelli et al.

[11] Patent Number: 5,235,502
[45] Date of Patent: Aug. 10, 1993

[54] ZERO CURRENT SWITCHING FORWARD POWER CONVERSION APPARATUS AND METHOD WITH CONTROLLABLE ENERGY TRANSFER

[75] Inventors: Patrizio Vinciarelli, Boston; Jay M. Prager, Tyngsboro, both of Mass.

[73] Assignee: VLT Corporation, San Antonio, Tex.

[21] Appl. No.: 861,157

[22] Filed: Mar. 27, 1992

Related U.S. Application Data

[63] Continuation of Ser. No. 799,675, Nov. 21, 1991, abandoned, which is a continuation of Ser. No. 681,412, Apr. 4, 1991, abandoned, which is a continuation of Ser. No. 440,882, Nov. 22, 1989, abandoned.

[51] Int. Cl.$^5$ .......................................... H02M 3/335
[52] U.S. Cl. ..................... 363/20; 323/235; 363/21; 363/131
[58] Field of Search ............... 323/222, 235; 363/20, 363/21, 131

[56] References Cited

U.S. PATENT DOCUMENTS

| | | | |
|---|---|---|---|
| 4,415,959 | 11/1983 | Vinciarelli | 363/21 |
| 4,441,146 | 4/1984 | Vinciarelli | 363/20 |
| 4,648,020 | 3/1987 | Vinciarelli | 363/71 |
| 4,675,797 | 6/1987 | Vinciarelli | 363/21 |
| 4,831,507 | 5/1989 | Colley et al. | 363/21 |
| 4,857,822 | 8/1989 | Tabisz et al. | 323/282 |
| 4,926,304 | 5/1990 | Marinus | 363/20 |
| 4,931,716 | 6/1990 | Jovanovic et al. | 323/285 |
| 4,951,186 | 8/1990 | Brakus et al. | 363/21 |

FOREIGN PATENT DOCUMENTS

| | | |
|---|---|---|
| 0344067 | 11/1989 | European Pat. Off. . |
| 3543299 | 6/1987 | Fed. Rep. of Germany . |
| 2608857 | 6/1988 | France . |
| 224559 | 12/1983 | Japan .................. 323/222 |
| WO82/03302 | 9/1982 | PCT Int'l Appl. . |

OTHER PUBLICATIONS

Duspiva et al, "Dual-Mode Switching Regulator," IBM Tech. Discl. Bul., vol. 17, No. 7, p. 2000,1, Dec. 1974.

Maksimovic, D. et al., "Constant Frequency Control Improves Quasi-Resonant Converters-Part I", PCIM, Jul. 1989, pp. 27-31.

Maksimovic, D. et al., "Constant Frequency Control Improves Quasi-Resonant Converters-Part II", PCIM, Aug. 1989, pp. 29-33.

*Primary Examiner*—William H. Beha, Jr.
*Attorney, Agent, or Firm*—Fish & Richardson

[57] ABSTRACT

An improved forward converter switching at zero-current incorporates a mechanism for selectively regulating the amount of forward energy which is delivered to a load during each converter operating cycle. Energy is transferred from a voltage source toward a load in discrete packets via a small effective inductance (specifically the small effective leakage inductance of a transformer) and a capacitor, the combination of which define a characteristic time scale for the rise and fall of current such that a switching device connected in series with the voltage source can be cycled on and off at zero-current. The capacitor is connected to the load via a second inductor. By incorporating a second bidirectional switch across the capacitor, and cycling the second switch on and off at appropriate times during a converter operating cycle, the amount of forward energy transferred toward the load may be regulated without incurring switching losses in the second bidirectional switching device, and control may also be asserted over reverse current flow from the load toward the second switch subsequent to forward energy transfer. The new topology allows a single converter to generate a multitude of voltage outputs, all of which may be maintained in regulation as the loads on the various outputs are varied, with no minimum load being required on any output.

55 Claims, 9 Drawing Sheets

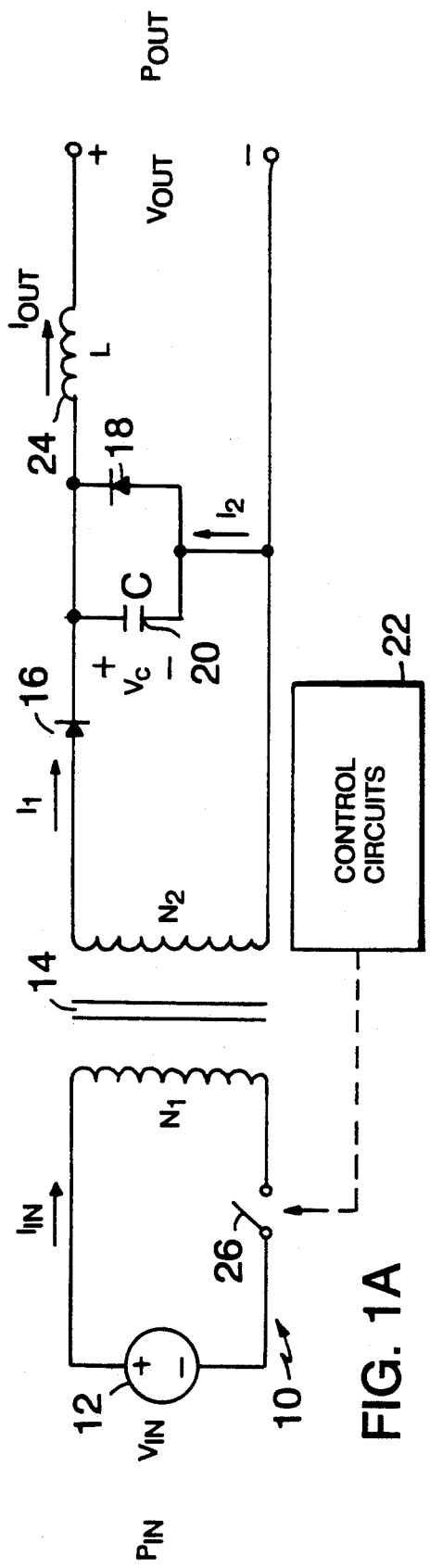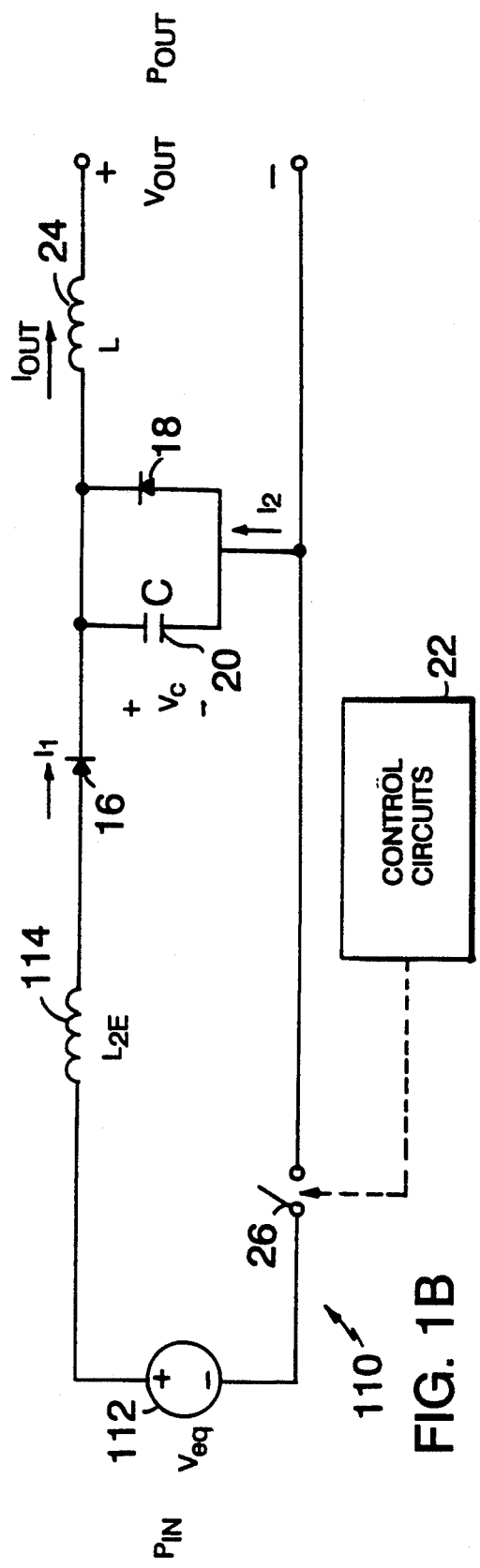
FIG. 1A
FIG. 1B

ZERO CURRENT SWITCHING FORWARD POWER CONVERSION APPARATUS AND METHOD WITH CONTROLLABLE ENERGY TRANSFER

This is a continuation of application Ser. No. 07/799,675, filed Nov. 21, 1991, now abandoned, which is a continuation of 07/681,412 filed Apr. 4, 1991, now abandoned, which is a continuation of 07/440,882 filed Nov. 22, 1989, now abandoned.

BACKGROUND OF THE INVENTION

This invention relates to zero-current switching, forward power conversion.

One such power converter scheme (e.g., the one described in Vinciarelli, U.S. Pat. No. 4,415,959, issued Nov. 15, 1983, assigned to the same assignee as this application, and incorporated herein by reference) transfers energy from a voltage source for delivery to a load using a transformer that has a controlled amount of effective secondary leakage inductance (e.g. a leakage reactance transformer). On the source side of the transformer, a switch is connected in series with the source and the primary winding of the transformer. The switch connects the source to and disconnects it from the primary winding in a succession of energy transfer cycles. On the load side of the transformer, a first unidirectional conducting device and a capacitor are connected in series with the secondary winding. The capacitor and the effective leakage inductance define a characteristic time scale for the cycling of the switch such that the switch is cycled on and off at times when the current in the switch and the first unidirectional conducting device are essentially zero. The first unidirectional conducting device constrains current flow in the effective leakage inductance to be directed only in the direction of the load, thereby preventing bidirectional energy flow (resonance) from occurring between the effective leakage inductance and the capacitor. Energy is transferred to the load via a second inductor whose value is large in comparison with the effective leakage inductance. This second inductor effectively appears as a current sinking load across the capacitor. A second unidirectional conducting device connected in parallel with the capacitor constrains the capacitor voltage to be unipolar and prevents bidirectional energy transfer from occurring between the second inductor and the capacitor. In the topology so described, the parameters of the circuit elements and the requirement of zero-current switching constrain the converter to unidirectionally transfer a fixed amount of energy during every energy transfer cycle. Because the output power is the product of that fixed amount of energy multiplied by the frequency of occurrence of the energy transfer cycles, control of the output power requires varying the frequency of the energy transfer cycles.

By effectively eliminating switching losses and simultaneously constraining energy transfer to occur only in the forward direction, the prior art topology allows implementation of converters which achieve power densities and efficiencies unachievable with either "non-zero-current switching" topologies or contemporary "resonant" topologies.

SUMMARY OF THE INVENTION

In one aspect, the invention is a zero-current switching converter in which the amount of energy transferred during a given energy transfer cycle may be selectively governed.

In general, in this aspect, the invention features the combination of
- a voltage source;
- a power transformer including a primary and a secondary winding, the power transformer being constructed to have an effective secondary leakage inductance L2e;
- a first switching device connected to selectively couple the power source across the primary winding of the power transformer;
- a first unidirectional conducting device connected in series with the secondary winding and oriented to conduct during conduction by the first switching device;
- a capacitor of capacitance C connected in series with the secondary winding and the first unidirectional conducting device;
- a controller having means for selectively closing and opening the first switching device to transfer power from the voltage source via the effective leakage inductance of the transformer to charge the capacitance during an energy transfer cycle having a characteristic time scale of $\pi\sqrt{L2e*C}$;
- and a second switching device connected on the secondary side of the transformer;
- the controller including a second control means for opening and closing the second switching device to selectively govern the amount of energy transferred during the energy transfer cycle. Preferred embodiments include the following features.

The second switching device may be connected in parallel with the capacitor to prevent charging of the capacitor when the second switching device is closed. An inductor is connected in series between the capacitor and a load to deliver current to the load. The second control means includes means for detecting closure of the first switching device, means for opening the second switching device at substantially the same time that the first switching device is closed, means for detecting voltage across the capacitor, and means for closing the second switching device when voltage across the capacitor is substantially zero.

In some embodiments, the converter circuit delivers power to two or more independent loads and for that purpose includes a primary inductor connected in series with the capacitor and one of the independent loads, and a plurality of secondary windings magnetically coupled to the primary inductor, the secondary windings respectively having relative numbers of turns that correspond to the relative voltages to be delivered respectively to the independent loads.

In some embodiments the secondary winding is connected to one of the independent loads via a subcircuit that includes a secondary unidirectional conducting device oriented to conduct current when the voltage across the primary inductor is positive in a direction between the load and the capacitor. Each subcircuit includes a filter element for smoothing the voltage across the independent load. The filter element may include a capacitor in parallel with the load.

Alternatively, each subcircuit comprises a post-regulator for regulating the voltage delivered to the independent load. The secondary windings may be loosely coupled to the primary inductor. The post-regulator may comprise a reset magnetic amplifier or a dissipative regulator.

In other embodiments the second switching device may consist of a switch capable of unidirectional conduction when closed connected in parallel with a second unidirectional conduction device, the switch and second unidirectional conducting device being oriented to conduct in opposite directions. This second switching device would be oriented so that said second unidirectional conducting device will prevent charging of said capacitor when current flowing in said second inductor is in a direction towards the load.

Alternatively, the second switching device may be connected in parallel with the secondary winding of the power transformer. A second unidirectional conducting device may be connected in parallel with the capacitor, oriented to prevent charging of the capacitor when current flowing in the second inductor is in a direction towards the load. An inductor is connected between the capacitor and the load.

In some embodiments, the second control means may include means for detecting closure of the first switching device, and means for opening the second switching device at a selected time thereafter.

In general, in another aspect, the invention features operating some embodiments of the converter circuit in a reverse boost mode by closing the second switching device when the voltage across the capacitor is substantially zero to prevent reverse current in the inductor from transferring energy to the capacitor.

In preferred embodiments, the second switching device is opened at substantially the same time that the first switching device is closed. The frequency at which the first switch is opened and closed is varied to effect output voltage regulation.

In general, in another aspect, the converter circuit is operated in a forward boost mode by holding the second switching device closed for a selected period of time after the first switching device has been closed.

In preferred embodiments, the second switching device is closed when voltage across the capacitor is substantially zero. The frequency at which the first switch is opened and closed is varied to effect output voltage regulation when the ratio of the value of the voltage source to the value of the output voltage of the converter is greater than the ratio of the number of turns on the primary of the power transformer to the number of turns on the secondary of the power transformer. The time period during which the second switching device remains closed is controlled so as to maintain the output voltage of the converter circuit in regulation irrespective of the relative values of the voltage source and the output voltage.

In general, in another aspect, the invention features controlling the converter circuit (in which the ratio of the number of turns on the primary of the power transformer to the number of turns on the secondary of the power transformer is greater than the ratio of the maximum value of the voltage source to the value of the output voltage of the converter) to operate in a forward boost mode, in which the second switching device is held closed for a selected period of time after the first switching device has been closed. In preferred embodiments, the second switching device is closed when voltage across the capacitor is substantially zero. The opening and closing of the first switching device occurs at constant frequency. The time period during which the second switching device remains closed is controlled so as to maintain the output voltage of the converter circuit in regulation.

Preferred embodiments include the following features. In some embodiments, the voltage source has a possibly varying voltage level, and the second switching device is opened when the level of current flowing in the first unidirectional conduction device rises to become equal to the level of current flowing in the direction of the load in the second inductor so long as the voltage level does not fall below a predetermined value, and is otherwise controlled to stay closed for a longer time period to maintain the output voltage of the converter circuit in regulation. In some embodiments, the opening and closing of the first switching device is permitted to occur at frequencies within a predetermined frequency band.

Among the advantages of the invention, the forward boost mode provides a mechanism for selectively increasing the amount of energy transferred per converter operating cycle, irrespective of the relative values of converter input and output voltage. In addition to providing a mechanism for eliminating the "dropout voltage" characteristic of the prior art converter, forward boost allows implementing converters which maintain the output voltage in regulation as output power is varied, yet which operate either at a constant, relatively high, frequency or within a narrow band of relatively high frequencies.

The reverse boost mode eliminates the cause of the "discontinuous mode" in the prior art converter. If the second switching device is opened at essentially the same time that the first switching device is closed, forward energy transfer per cycle will be reduced as power output is reduced and output voltage may be regulated while operating the converter within a relatively narrow range of relatively high frequencies. Reverse boost also allows another embodiment where multiple auxiliary windings on the second inductor may be used to generate a multitude of regulated outputs, each one of which would remain in regulation as loads on the various outputs are independently varied. The voltages generated by the auxiliary windings will be related to the main output voltage by the ratio of the number of turns on any particular auxiliary winding to the number of turns on the main winding. Because current is permitted to reverse in the second inductor, energy transferred to the various auxiliary loads is not limited to the magnetic energy stored in the second inductor at the time that the auxiliary unidirectional conducting devices start conduction but may also be sourced from energy storage elements which form part of the main output load (i.e. filter capacitors).

Since opening and closing of the second switching device in both forward and reverse boost modes takes place at times when the voltage across it is essentially zero, and since the presence of the capacitor across the second switching device prevents instantaneous changes in voltage from occurring across it during its switching transitions, switching losses in the second switching device are avoided and forward and reverese boost are consistent with the essentially lossless character of the underlying zero-current switching conversion process.

In summary, the enhanced zero-current switching topology more closely approaches an "ideal" power conversion topology by providing:

A means for maintaining output voltage regulation, while power output is varied, while operating either at a constant, relatively high, frequency, or within a narrow band of relatively high frequencies;

A means for controlling the effects of current reversal in the second inductor, thereby eliminating the "discontinuous mode", and allowing reduction in the value of the second inductor to a value consistent with other desirable performance goals;

A means for easily generating a multitude of regulated outputs, each one of which would remain in regulation as loads on the various outputs are independently varied;

A means for reducing the value of input voltage required to maintain output voltage regulation while power output is varied;

A means for further improving power density by increasing power output without increasing maximum operating frequency, while simultaneously allowing reduction both in the inductance value and the physical size of the second inductor;

The benefits achieved with the underlying zero-current switching forward converter.

Other advantages and features will become apparent from the following description of the preferred embodiments, and from the claims.

DESCRIPTION OF THE PREFERRED EMBODIMENTS

We first briefly describe the drawings.

FIG. 1A is a schematic of a prior-art zero-current switching forward converter; FIG. 1B is an equivalent circuit.

STRUCTURE AND OPERATION

Figure 2A:
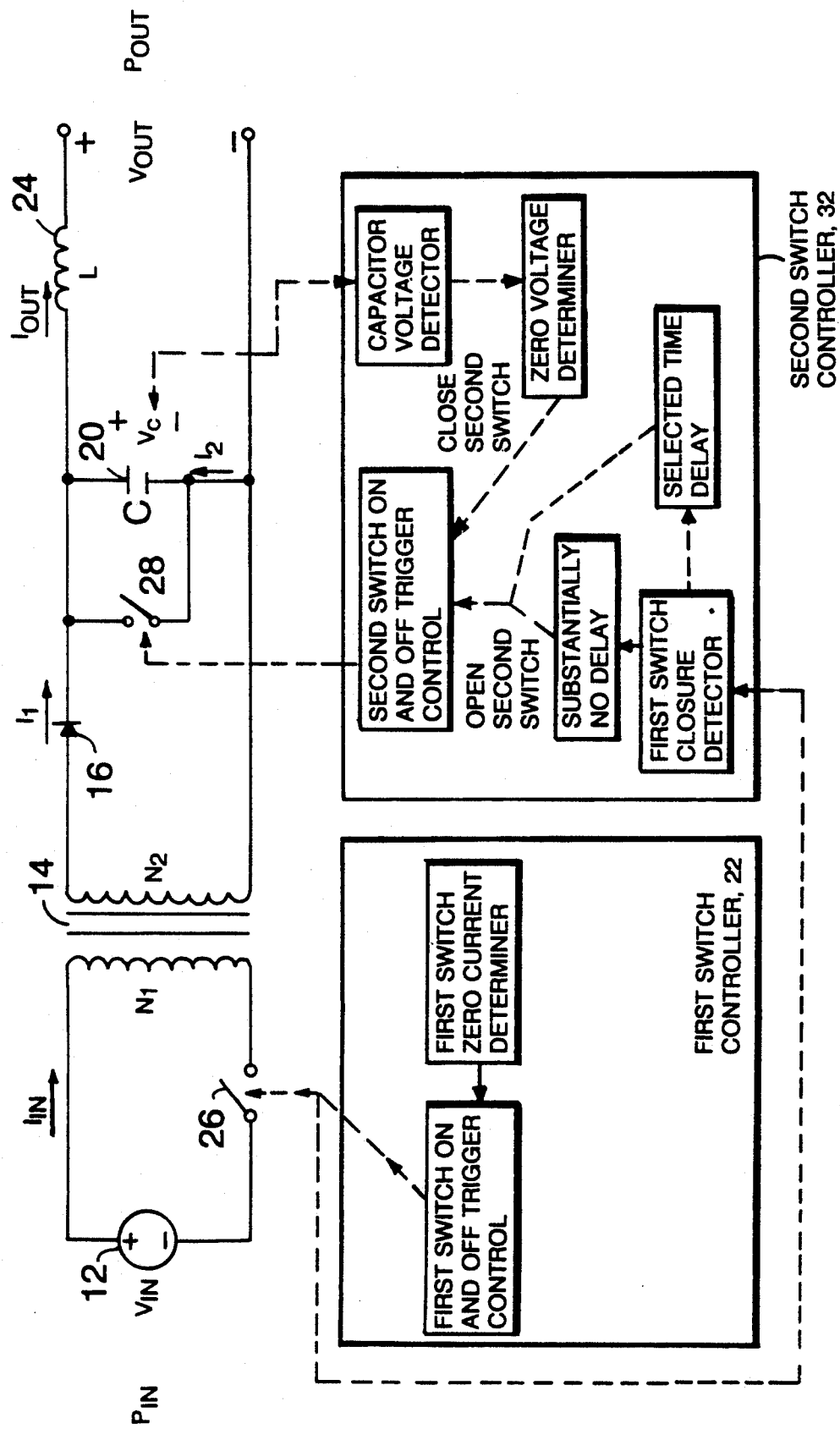
FIG. 2A is a schematic of a preferred embodiment of a zero-current switching forward converter in accordance with the present invention.

FIG. 1A is a schematic of an embodiment of a zero-current switching power converter of the kind described in U.S. Pat. No. 4,415,959 (referred to hereafter as the "prior art converter"). FIG. 1B is a schematic of the prior art converter where the input source 12, leakage reactance transformer 14, and the first switch 26, are replaced by a model consisting of an effective inductance 114, of value $L_{2e}$, representing the effective secondary leakage inductance of leakage reactance transformer 14, a transformed input source 112 whose voltage value, $V_{eq}$, is the value of input source 12, $V_{in}$, multiplied by the secondary-to-primary turns ratio of transformer 14, and a first switch 26.

In the prior art converter 110 of FIG. 1B, power is transferred from a transformed input source 112 of voltage $V_{eq}$ to a load (not shown) whose voltage is regulated to be at a value $V_{out}$. Conservation of power requires that:

$$Pin = Pout + \text{Heat Losses,} \quad (1)$$

so, $Pin \geq Pout$ i.e. $V_{eq}*I1 \geq V_{out}*I_{out}$ where $I_1$ and $I_{out}$ are the average currents flowing in first unidirectional conducting device 16 and the second inductor 24, respectively. $I_{out}$ is the sum, or mixture, of the two currents $I_1$ and $I_2$:

$$I_{out} = I_1 + I_2 \quad (2)$$

The presence of the second unidirectional conducting device 18 constrains the average value of $I_2$ to positive values which flow in the direction of conduction of the second unidirectional conducting device 18. Since both $I_1$ and $I_2$ are constrained to be positive, then Equation 2 requires:

$$I_{out}/I_1 \geq 1 \quad (3)$$

Since, from Equation 1:
$V_{eq} \geq V_{out}*I_{out}/I_1$ then,
$V_{eq} \geq V_{out}$.
Said another way, by constraining the average current $I_2$ to a range of positive values only, the behavior of the second unidirectional conducting device 18 limits the prior art converter to operating only in a "buck" mode (i.e. for $V_{eq} > V_{out}$).

From an energy transfer viewpoint, the behavior of the second unidirectional conducting device 18 in the prior art converter is also responsible for the dependence of output power on operating frequency. Upon initiation of a cycle, closure of the first switching device 26 impresses the transformed input source voltage $V_{eq}$ across the effective inductance 114, whose initial instantaneous current, $I_1$, is zero. A positive ramp of current $I_1$ will flow in the effective inductance 114 until the current in the second unidirectional conducting device 18 (i.e. the difference between the instantaneous current in the effective inductance 114 and the instantaneous current in the second inductor 24, $I_{out}$), becomes zero, at which time the second unidirectional conducting device 18 ceases conducting. Once the second unidirectional conducting device 18 ceases conducting, energy transfer from the transformed input source via the effective inductance 114 to the capacitor 20 and load commences. Using procedures known to one skilled in the art, it can be shown that during this energy transfer cycle the voltage across the capacitor 20 will be:

$$v_c(t) = L_p \cdot \left[ \frac{V_{eq}}{L_{2e}} + \frac{V_{out}}{L} \right] \cdot \left[ 1 - \cos\left[ 2 \cdot \frac{\pi}{T_1} t \right] \right] + \quad (4)$$

$$\frac{2 \cdot \pi \cdot L_p}{T_1} [I_p - I_o] \cdot \sin\left[ 2 \cdot \frac{\pi}{T_1} \cdot t \right]$$

and the current in the effective inductance 114 is:

$$I_1(t) = I_p + [I_o - I_p] \cdot \frac{L}{L_s} \left[ 1 - \cos\left[ 2 \cdot \frac{\pi}{T_1} \cdot t \right] \right] + \quad (4a)$$

$$\frac{L \cdot T_1}{2 \cdot \pi \cdot L_s} \left[ \frac{V_{eq}}{L_{2e}} + \frac{V_{out}}{L} \right] \cdot$$

$$\sin\left[ 2 \cdot \frac{\pi}{T_1} \cdot t \right] + \frac{V_{eq} - V_{out}}{L_s} \cdot t$$

where:

$I_p$ is the instantaneous value of the current, $I_1$, which is flowing in the effective inductance 114, of value $L_{2e}$, in a positive direction towards the capacitor 20, at the instant that the second unidirectional conducting device 18 ceases conduction; $I_o$ is the instantaneous value of the current, $I_{out}$, which is flowing in the second inductor 24, of value L, in a positive direction towards the load, at the instant that the second unidirectional conducting device 18 ceases conduction; $L_s$ is the sum of the inductance values of the effective inductance 114 and the second inductor 24 i.e. $L_s = L_{2e} + L$;

$L_p$ is the "paralleled" value of the inductance values of the effective inductance 114 and the second inductor 24 i.e. $L_p = L_{2e} \cdot L/(L_{2e} + L)$;

and $T_1$ is the period of the effective LC circuit which results from the combination of the capacitor 20 and the "paralleled" value of inductance, $L_p$:

$$T_1 = 2\pi \sqrt{L_p \cdot C} \ .$$

The half period, $T_1/2$, defines a characteristic time scale for the rise and fall of currents during the energy transfer cycle:

$$T_1/2 = \pi \sqrt{L_p \cdot C} \ .$$

For the prior art converter, the second unidirectional conducting device 18 ceases conducting when the values of $I_1$ and $I_{out}$ are equal. Thus, the values of $I_p$ and $I_o$ are also equal, and Equations 4 and 4a reduce to:

$$v_c(t) = L_p \cdot \left[ \frac{V_{eq}}{L_{2e}} + \frac{V_{out}}{L} \right] \cdot \left[ 1 - \cos\left[ 2 \cdot \frac{\pi}{T_1} \cdot t \right] \right] \quad (5)$$

$$I_1(t) = I_o + \frac{L \cdot T_1}{2 \cdot \pi \cdot L_s} \left[ \frac{V_{eq}}{L_{2e}} + \frac{V_{out}}{L} \right] \cdot \quad (5a)$$

$$\sin\left[ 2 \cdot \frac{\pi}{T_1} \cdot t \right] + \frac{V_{eq} - V_{out}}{L_s} \cdot t$$

For the prior art converter, controlled periodic forward energy flow depends upon the presence of a current sinking load across the capacitor 20. This demands that the value of the second inductor 24, L, be very large in comparison with the value of the effective inductance 114, $L_{2e}$. Using the approximation that the ratio of L to $L_{2e}$ approaches infinity, Equations 5 and 5a may be further reduced to:

$$v_c(t) = V_{eq} \cdot \left[ 1 - \cos\left[ 2 \cdot \frac{\pi}{T_o} \cdot t \right] \right] \quad (6)$$

$$I_1(t) = I_o + V_{eq} \cdot \frac{T_o}{2 \cdot \pi \cdot L_{2e}} \cdot \sin\left[ 2 \cdot \frac{\pi}{T_o} \cdot t \right] \quad (6a)$$

where the characteristic time scale $T_o/2 = \pi\sqrt{L_{2e} \cdot C}$.

Both Equations 5 and 6 indicate that the peak voltage on the capacitor is dependent only on the value of the transformed input source voltage $V_{eq}$, and is independent of $I_o$. Since energy transfer per cycle, E, is first order dependent on the peak energy transferred to the capacitor during a cycle:

$$E = \tfrac{1}{2} \cdot C \cdot V^2 \quad (7)$$

varying output power requires varying the operating frequency of the converter.

Another characteristic of the prior art converter is that it incorporates no mechanism for controlling the effects of reverse energy transfer from the load to the capacitor 20. The second unidirectional conducting device 18 prevents energy stored in the second inductor 24 from being transferred to the capacitor during the last phase of the converter operating cycle when the capacitor voltage is zero and positive current $I_{out}$ flows in the second inductor 24. Stated another way, the second unidirectional conducting device 18 prevents energy transfer to the capacitor 20 so long as the second inductor 24 is transferring energy to the load. However, below some value of load, current reversal in the second inductor cannot be prevented. Once the voltage across the capacitor 20 reaches zero at the end of the energy transfer cycle, the reverse voltage across the second inductor 24 will be equal to the load voltage, and the current in the second inductor 24 will decay at a fixed rate, independent of load:

$$dI_{out}/dt = -V_{out}/L. \quad (8)$$

Since operating frequency drops as $P_{out}$ drops, for any finite value of L there will be some value of $P_{out}$ (i.e. $I_{out}$) below which reverse current flow in the second inductor 24 cannot be prevented. Once this occurs, energy flowing back from the load (i.e. from energy storing elements at the load, such as filter capacitors) into capacitor 20 will asynchronously interfere with periodic forward energy transfer and exhibit itself as increased converter output noise. While relatively larger values of second inductance will limit the onset of this "discontinuous mode" to lower values of load, other considerations mitigate against too large a value (i.e. power density, efficiency, and closed-loop bandwidth).

Referring to FIG. 2A, a preferred embodiment of a zero-current switching power converter 50 according to the present invention is modified from the prior art converter 10 so that:

$V_{out}$ may be regulated even when $V_{in}$ decreases to a value less than $V_{out}$ (i.e. to a level at which the average value of $I_2$ would have to go negative to support $V_{out}$);

the amount of forward energy, E, transferred during each cycle, may be varied, thereby allowing $P_{out}$ to be controlled without changing the operating frequency of the converter; both reverse energy transfer from the load to the capacitor, and forward energy transfer from the source to the capacitor may be simultaneously controlled, thereby eliminating the "discontinuous" mode of operation and allowing a mode of operation whereby the output voltage may be regulated as $P_{out}$ varies while the converter operates over a relatively narrow range of high frequencies.

In converter 50, a second switch 28, capable of bidirectional conduction, replaces the second unidirectional conducting device 18 of FIG. 1A. As in the prior art converter, a voltage source 12 is coupled to the primary winding of a leakage reactance transformer 14 via a first switch 26. First switch 26 is cycled on and off by a control circuit 22. Second switch 28 is cycled on and off by controller 32. Control circuit 22 and controller 32 may be parts of a single controller. A first unidirectional conducting device 16 and a capacitor 20 are connected in series with the secondary winding of leakage reactance transformer 14. The second switch 28 is connected across the capacitor 20. A second inductor 24 is connected in series between the capacitor 20 and the load.

Figure 2B:
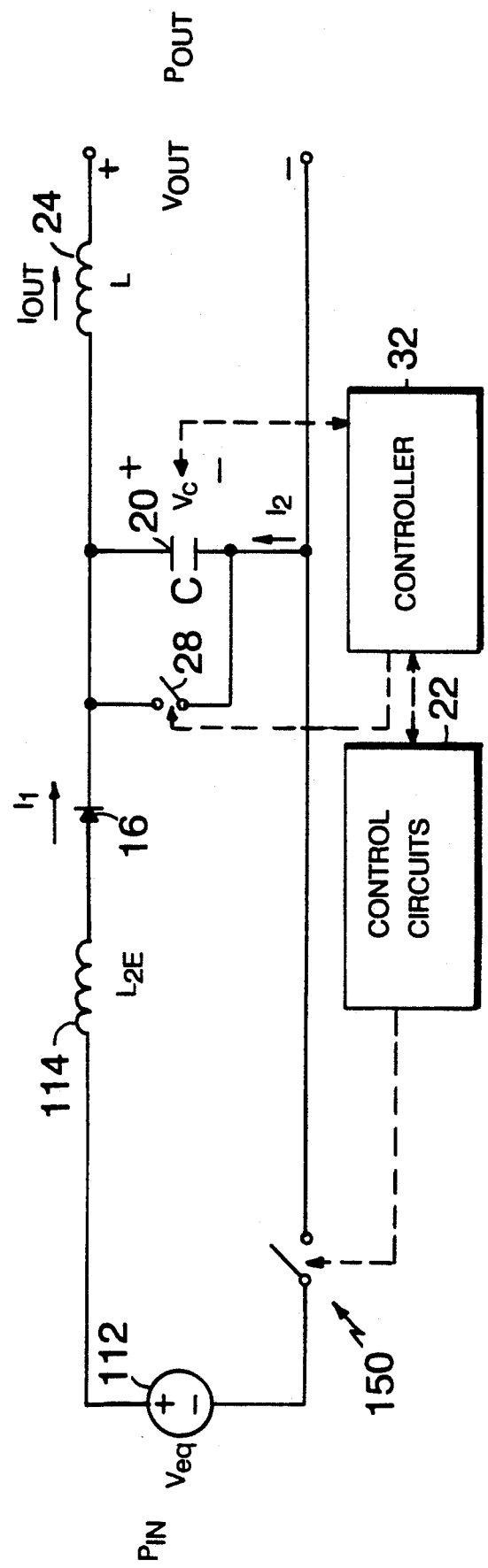
FIG. 2B is an equivalent circuit.
Figure 3A:
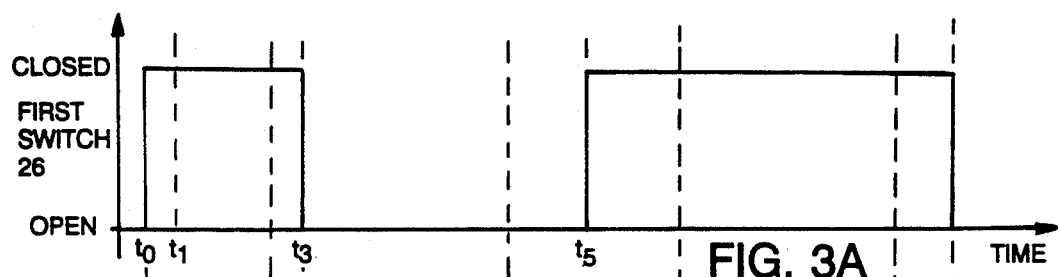
FIGS. 3A-3D show current and voltage waveforms useful in describing the Forward Boost mode of operation of the converter circuit schematically shown in FIG. 2.
Figure 3B:
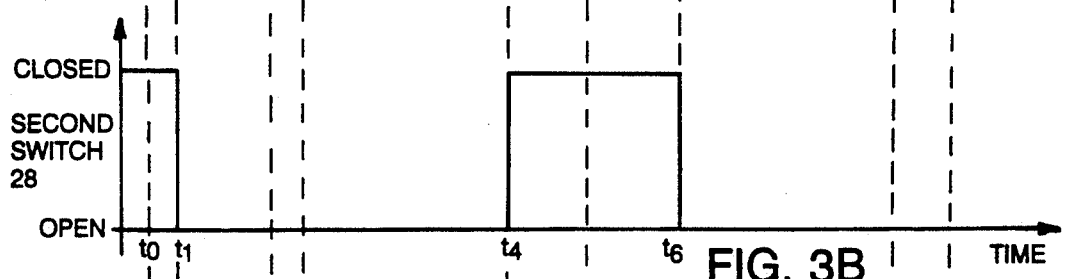
Figure 3C:
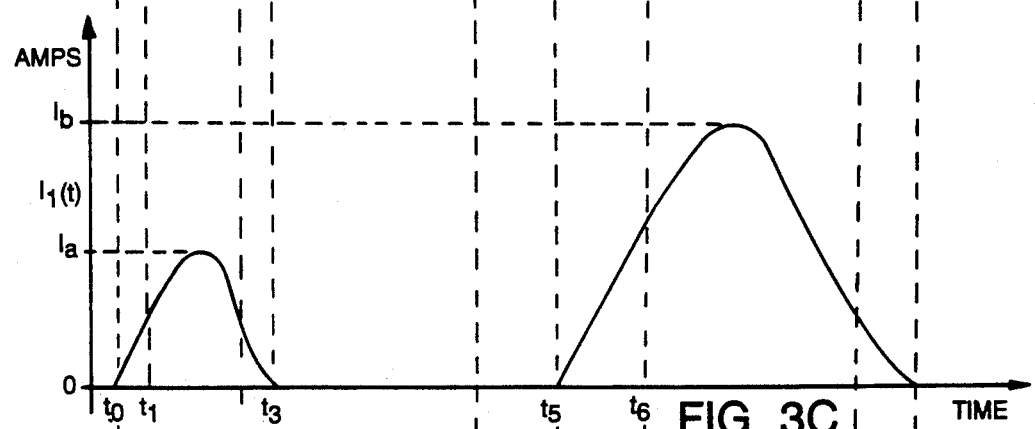
Figure 3D:
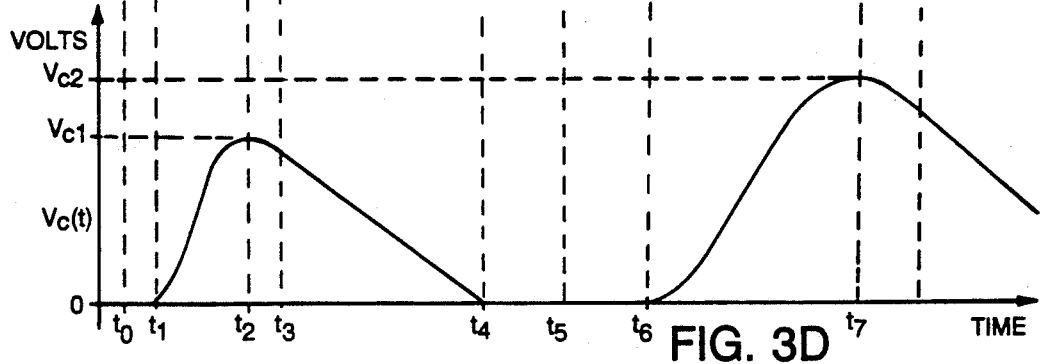

FIG. 2B shows the model of the converter 150 where the salient characteristics and effects of the leakage reactance transformer have been incorporated into a first effective leakage inductance 114 and a transformed input source of value $V_{eq} = V_{in}*(N2/N1)$, where N2 and N1 are the number of turns on the secondary and primary windings of the leakage reactance transformer 14, respectively.

FIGS. 3A-3D show the waveforms of the converter 150 operating in a mode referred to as Forward Boost mode. At time $t_0$, with second switch 28 already closed, and with a positive current $I_{out}$ flowing in the second inductor 24 in the direction of the load, and a positive current of equal value flowing in a positive direction in the second switching device 28, the first switch 26 is closed by control circuit 22, initiating a converter operating cycle. Upon closing the first switch 26, the transformed input source 112 causes a positive, linearly increasing, current, $I_1$, to start flowing in the effective inductance 114. Because the second switch is closed, current $I_1$ flows through the first unidirectional conducting device 16 and second switch 28, and returns to the transformed input source, thus storing energy in the effective inductance 114. In the prior art converter 10, 110, this first phase of the converter cycle would end when the instantaneous value of current $I_1$ became equal to the instantaneous value of current $I_{out}$, at which point the second unidirectional conducting device 18 (FIG. 1B) would cease conducting, and energy transfer to the capacitor 20 and load would commence. However, if, in FIG. 2B, the controller 32 holds the second switch 28 closed long enough to allow the instantaneous value of current $I_1$ to increase beyond the instantaneous value of $I_{out}$ (i.e. if, in Equation 4a, the value, $I_p$, of current $I_1$ at time $t_1$ is greater than the instantaneous value of current $I_{out}$ at time $t_2$), then more energy will be stored in the effective inductance 114 in the converter of FIG. 2B than would be stored in the effective inductance 114 of the prior art converter, if all other circuit elements are equal in value. By varying the amount of time that the second switch 28 remains closed after the first switch 26 closes, the amount of energy stored in the effective inductance in a converter according to the present invention can be varied within a continuous range of values. Said another way, by providing for negative flow of current $I_2$, the second switch 28, of FIG. 2, provides a mechanism for increasing the average current $I_1$ to values which are greater than the average value of the current $I_{out}$. In accordance with Equations 1 and 2, this allows maintaining output voltage in regulation, as power is varied, for values of transformed input source 112, $V_{eq}$, which are less than the regulated output voltage, $V_{out}$. Thus, Forward Boost provides a mechanism for overcoming the "dropout voltage" limitation of the prior art converter.

Referring again to FIGS. 3A to 3D, at time $t_1$, second switch 28 is opened by controller 32 and the energy transfer phase of the converter operating cycle begins. Equation 4 will again describe the behavior of the capacitor voltage during this phase, using values for $I_p$ and $I_o$ which correspond to the instantaneous values of $I_1$ and $I_{out}$ when the second switch opens. In contrast to the prior art converter, where the equality of $I_1$ and $I_{out}$ at the initiation of energy transfer caused the peak capacitor voltage to depend only upon $V_{eq}$ (Equations 5 and 6), the peak voltage on the capacitor ($V_{c1}$, at time $t_2$ in FIG. 3D) in the converter of FIG. 2B will also depend on the difference in the currents $I_1$ and $I_{out}$ at the time that the second switch 28 is opened. Thus, for otherwise equal values of circuit elements, the converter of FIG. 2B can "boost" its forward energy transfer to values greater than that which can be transferred by the prior art converter of FIG. 1B, and can furthermore regulate the degree of Forward Boost within a continuous range of energy values by regulating the time period $t_0$ to $t_1$. The boosted peak value, $V_{c1}$, of capacitor voltage, Vc, and the boosted peak value of $I_a$, of the current $I_1$, in FIGS. 3C and 3D, will therefore be greater than the corresponding peak values which would be found in a prior art converter, all other circuit elements being equal.

Referring again to FIGS. 3A-3D, the forward energy transfer phase is followed by a period during which energy stored in the capacitor 20 is, via the medium of the second inductor 24, delivered to the load. At time $t_3$, the current $I_1$ returns to zero and the first switch 26 is turned off. From time $t_3$ to time $t_4$, the capacitor 20 voltage decays to zero as its stored energy is delivered to the load by the positive current $I_{out}$. At time $t_4$, when the capacitor 20 voltage returns to zero, second switch 28 is closed, preventing positive current flow in the second inductor 24 from reverse charging the capacitor 20.

Another operating cycle is also shown in FIGS. 3A-3D, starting at time $t_5$. In this cycle, however, the period $t_5$ to $t_6$, during which both the first switch 26 and the second switch 28 are closed, is longer than the equivalent period, $t_0$ to $t_1$, of the first cycle. The effect of the increased amount of Forward Boost is evidenced by the relatively larger value, $I_b$, of current, $I_1$, flowing in the effective inductance 114 at time the second switch 28 is opened, and the correspondingly greater peak value, $V_{c2}$, of capacitor 20 voltage, $V_c$, at time $t_7$.

As a practical matter, typical commercially available single switching devices cannot efficiently perform the function of the bidirectional second switch 28, in FIG. 2, at the high operating frequencies at which the converter will operate. An alternate embodiment of the present invention implements the second switch 28, of FIG. 2, with the circuit arrangement of FIG. 4. The circuit is comprised of a second unidirectional conducting device 50 connected across a unidirectional switch 52, such that the preferred directions of conduction of the two devices are in opposition (as indicated by the arrows adjacent to the two devices). The unidirectional switch 52 might be a bipolar or a MOSFET transistor. Utilizing this circuit allows all the benefits of Forward Boost to be obtained without compromise. During the initial phases of an operating cycle, when the unidirectional switch 52 is on, the second unidirectional conducting device 50 will conduct positive current $I_2$ until the current passes through zero, at which point the unidirectional switch 52 will smoothly take over conduction of negative current flow. It should be noted that if the unidirectional switch 52 is opened prior to the current $I_2$ going negative, the presence of the second unidirectional conducting device 50 will cause operation to revert to that of a prior art converter.

As demonstrated above, by providing a mechanism for supporting negative flow of current $I_2$, the topology of the present invention may be used to selectively regulate the amount of forward energy transferred during a converter operating cycle, irrespective of the relative values of the transformed input source 12 and the regulated output voltage, $V_{out}$. Through use of an appropriate controller 32 (which may be a part of control circuit 22), and correspondingly appropriate values of the circuit elements, many possible converter operating modes can be realized which exploit this mechanism.

For example, the present invention might be used solely to provide reduced input operating voltage capability during transient periods of severe input source "brownout". In this implementation, the second switch 28 circuit 28, of FIG. 4, would be incorporated into the topology of FIG. 2, but the unidirectional switch 52 would be maintained in its off state until the converter input voltage dropped below some predetermined level, $V_{min}$. In such an implementation, for input voltages above $V_{min}$ (i.e. as an example, between 200 VDC and 400 VDC), the converter will operate as a prior art converter and provide all the benefits of the prior art topology. However, should voltage drop below $V_{min}$, Forward Boost mode would be asserted and output voltage regulation would be maintained down to relatively lower values of input voltage than could otherwise be supported by the prior art topology (for example, down to 100 VDC).

In another implementation, the turns ratio of the leakage reactance transformer 14 of FIG. 2A could be set to ensure that, for the maximum specified value of input source 12, the value of transformed input source voltage 112 will always be less than the desired value of regulated output voltage $V_{out}$. The turn-on transitions of the main switch would be controlled, by control circuits 22, to occur at a constant frequency. By procedures known to one skilled in the art, a controller 32 would be implemented which would, in response to deviations of the actual converter output voltage from the desired value of regulated output, $V_{out}$, selectively regulate the time between closure of the first switch 26 and opening of the second switch 28, thereby regulating the amount of Forward Boost asserted as a means of maintaining output voltage in regulation as output power is varied. In this implementation, some controlled degree of Forward Boost is always asserted and the output voltage will be maintained in regulation, as the load is varied, while the converter is operating at a constant frequency. It should be noted that the value, L, of the second inductor 24, can be substantially reduced in a converter operating in this mode, with a corresponding reduction in both physical size and losses. While the prior art converter needed a large value of L to delay the onset of "discontinuous" mode at light loads (i.e. to maintain positive current flowing in the second inductor 24 at low operating frequencies), the high constant operating frequency in this mode reduces the time period during which the second inductor 24 must support energy transfer to the load between converter forward energy transfer cycles, and the amount of energy which needs to be stored in the second inductor 24 is reduced.

Many other controller implementations are possible which can utilize the benefits of the present invention in some advantageous way. For example, instead of providing constant frequency operation, an alternative control scheme might limit operation to a narrow band of frequencies. Or, Forward Boost might be used solely to enable a prior art converter to deliver greater values of output power, either on a transient or a continuous basis, thereby providing improvement in power density.

Figure 5:
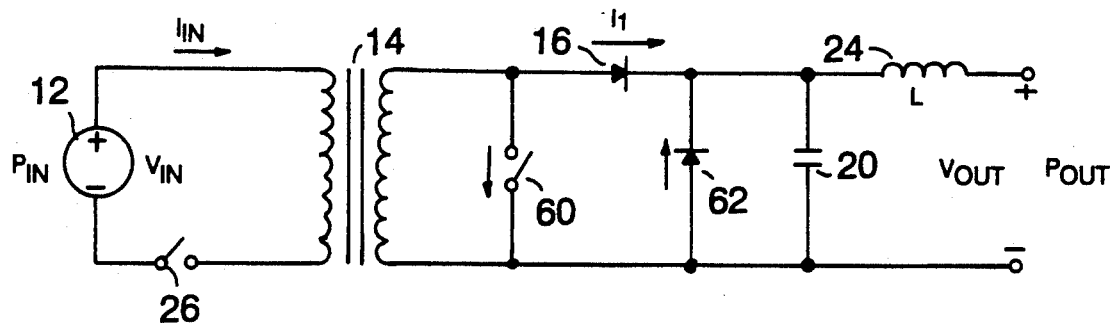
FIG. 5 is a schematic of another embodiment of the zero-current switching converter of FIG. 2.

An alternate embodiment of the present invention, useful for operation in Forward Boost mode, is disclosed in FIG. 5. In the figure a unidirectional switch 60 is connected directly across the secondary winding of the leakage reactance transformer, and a second unidirectional conducting device 62 is connected across the capacitor 20. In a practical converter implementation, this topology will exhibit slightly lower losses than the topology of FIG. 2, since the first unidirectional conducting device 16 does not carry current during the Forward Boost phase of the cycle when the unidirectional switch 60 is carrying current.

Figure 6A:
FIGS. 6A-6E show current and voltage waveforms useful in describing the Reverse Boost mode of operation of the converter circuit schematically shown in FIG. 2.
Figure 6B:
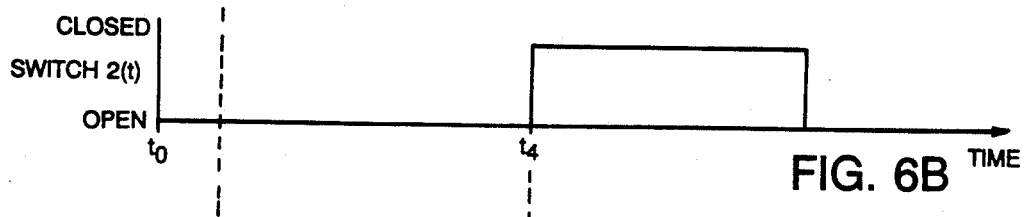
Figure 6C:
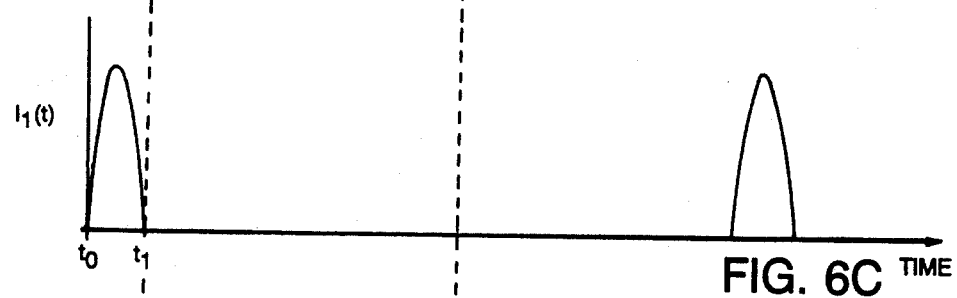
Figure 6D:
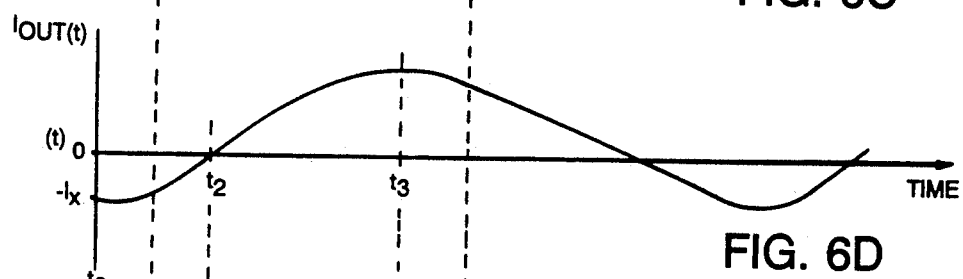
Figure 6E:
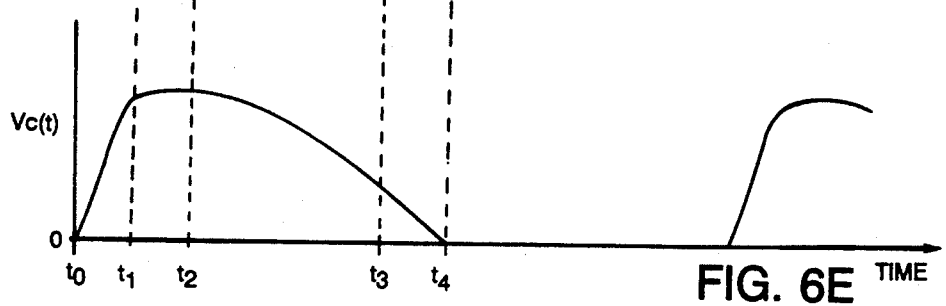

FIGS. 6A-6E show the waveforms of the converter 150 of FIG. 2 operating in a mode referred to as Reverse Boost mode (at a relatively low value of $P_{out}$). In this mode of operation, current in the second inductor 24, $I_{out}$, is permitted to reverse during an operating cycle, so that at the beginning of a subsequent cycle $I_{out}$ is flowing in a negative direction (i.e. from the load toward the second switching device 28). Just prior to time $t_0$ in FIG. 6, first switch 26 is open, and the second switching device 28 is closed. Negative current $I_{out}$ is flowing from the load (i.e. from energy storing elements which form part of the load, such as filter capacitors) towards the second switching device 28, and is by-passed around the capacitor 20 and returned to the load via the second switching device 28. The value of $I_{out}$ just prior to time $t_0$ is $-I_x$, as shown in FIG. 6D. The capacitor 20 voltage is at zero due to the second switching device 28 being closed. Under these conditions, if the second switching device 28 is opened at essentially the same time that the first switch 26 is closed, a Reverse Boost cycle will be initiated. In FIGS. 6A and 6B the cycling of the switches is shown taking place simultaneously at time $t_0$, resulting in immediate initiation of energy transfer from the transformed input source 112 to the capacitor 20, as shown in FIG. 6C. The capacitor voltage during the forward energy transfer phase will be given by Equation 4, with the initial value of current $I_p$ equal to zero, and the initial value of current $I_o$ equal to $-I_x$. Thus:

$$v_c(t) = L_p \cdot \left[ \frac{V_{eq}}{L_{2e}} + \frac{V_{out}}{L} \right] \cdot \left[ 1 - \cos\left[ 2 \cdot \frac{\pi}{T_1} \cdot t \right] \right] + I_x \cdot 2 \cdot \pi \cdot \frac{L_p}{T_1} \cdot \sin\left[ 2 \cdot \frac{\pi}{T_1} \cdot t \right] \quad (9)$$

Using procedures known to one skilled in the art, the current flowing in the effective inductance 114 during the forward energy transfer phase can be shown to be:

$$I_1(t) = L \cdot \frac{T_1}{2 \cdot \pi \cdot L_s} \left[ \frac{V_{eq}}{L_{2e}} + \frac{V_{out}}{L} \right] \cdot \sin\left[ 2 \cdot \frac{\pi}{T_1} \cdot t \right] - I_x \cdot \frac{L}{L_s} \left[ 1 - \cos\left[ 2 \cdot \frac{\pi}{T_1} \cdot t \right] \right] + \frac{V_{eq} - V_{out}}{L_s} \cdot t \quad (10)$$

Examination of Equation 10 reveals that both the peak value of $I_1(t)$, and the time duration during which $I_1(t)$ is positive (i.e. the time period $t_0$ to $t_1$), are strongly dependent on the value, $I_x$, of negative current $I_{out}$ which is flowing at time $t_0$. This is to be expected, since, after opening the second switch 28, the negative current $I_x$ starts to positively charge the capacitor 20. Positive voltage buildup on the capacitor 20, in response to the negative current $I_x$, acts to reduce the voltage across the effective inductance 114 during the energy transfer phase, thereby acting as a barrier to current flow and reducing forward energy transfer. Neglecting the term which is first-order dependent on t, Equation 10 may be rewritten as:

$$I_1(t) = I_f \cdot \sin\left[ 2 \cdot \frac{\pi}{T_1} \cdot t \right] + I_r \cdot \left[ 1 - \cos\left[ 2 \cdot \frac{\pi}{T_1} \cdot t \right] \right] \quad (11)$$

where:

$$I_f = L \cdot \frac{T_1}{2 \cdot \pi \cdot L_s} \cdot \left[ \frac{V_{eq}}{L_{2e}} + \frac{V_{out}}{L} \right] \quad (12)$$

and, $$I_r = I_x \ast (L/L_s). \quad (13)$$

If is the peak value of forward current, $I_1(t)$, which would be reached if the initial current, $I_x$, in the second inductor 24 were zero at the start of a cycle. As shown in Equations 10 and 12, If is dependent only on the values of fixed circuit elements, and the input and output voltages, and is independent of load. Also referring back to Equation 5a, If is the same as the value of peak current which would flow in the effective inductance 114 of a prior art converter 110 if an energy transfer cycle were started with an initial value of current, $I_o$, equal to zero in the effective inductance 114. $I_r$, in Equation 11, accounts for the effect of the load-dependent negative value of reverse current, $I_x$, in the second inductor 24, at time $t_0$.

Figure 7:
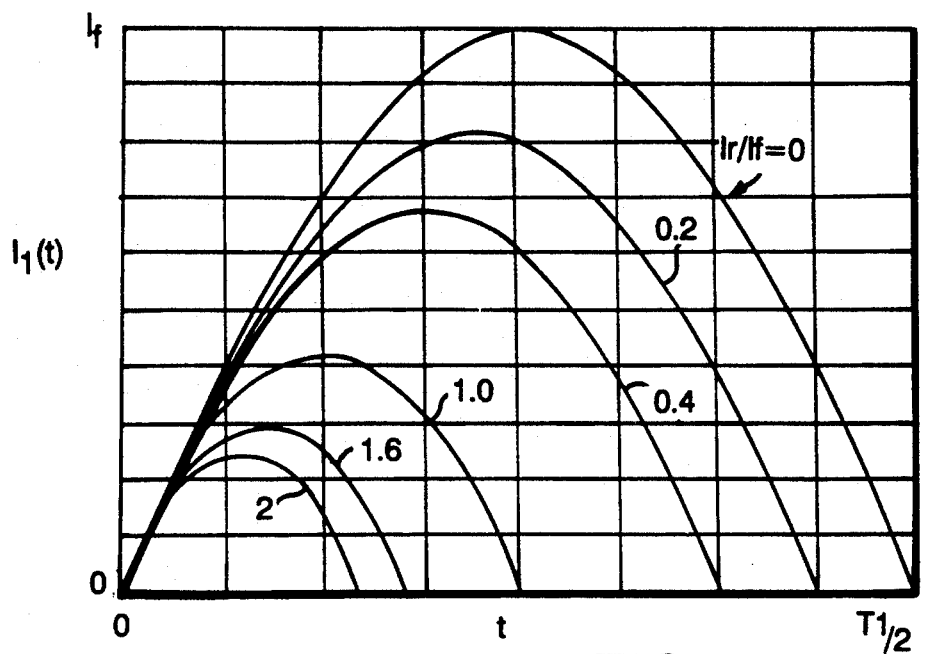
FIG. 7 shows the effect of different negative values of output current at the initiation of an energy transfer cycle on the waveforms of converter forward current during the Reverse Boost mode of operation.
Figure 8:
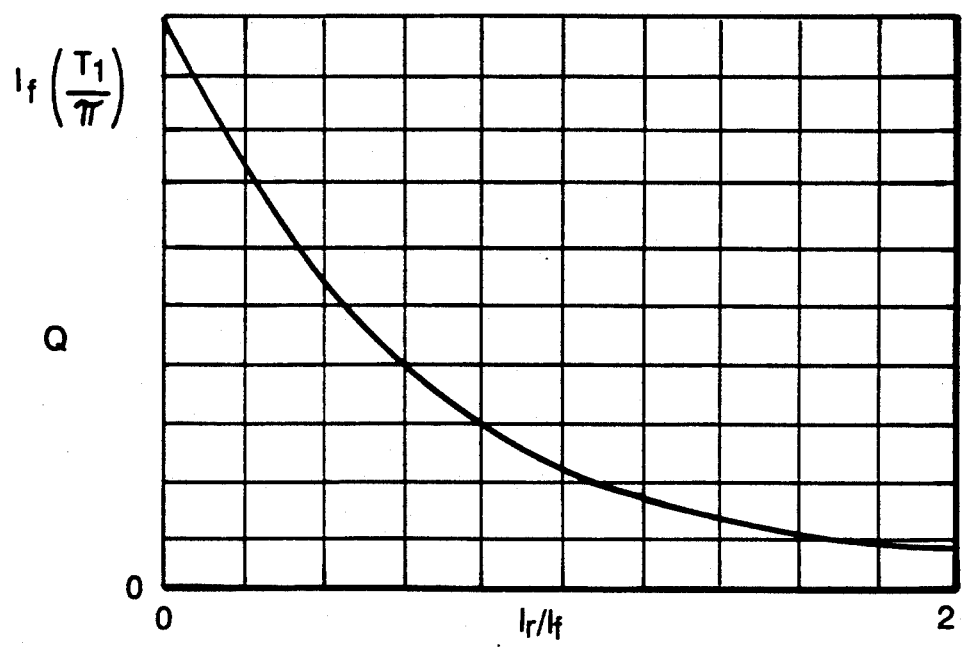
FIG. 8 shows the effect of different negative values of output current at the initiation of an energy transfer cycle on forward charge transferred by the converter during the Reverse Boost mode of operation.

FIG. 7 shows waveforms of the forward current, $I_1(t)$, of Equation 11, for different values of the ratio $I_r/I_f$. In accordance with Equations 5a and 11, the waveform for $I_r/I_f=0$ would be the same for both a prior art converter and a converter according to the present invention if values of circuit elements were equal and an energy transfer cycle were started when the instantaneous value of output current, $I_{out}$, were zero in both. The effect of increasing the ratio $I_r/I_f$(i.e. increasing $I_x$) is illustrated to be a sharp decrease in both the peak value and the time duration of the forward current flow, $I_1(t)$. Mathematical integration of Equation 11, over the time period during which positive current flows, results in a value for the amount of charge transferred per cycle, Q. FIG. 8 shows the effect of reverse current, $I_x$, on forward charge transferred per cycle for a converter according to the present invention operating in Reverse Boost mode.

FIGS. 7 and 8 illustrate the effect that initial reverse current flow in the second inductor 24 has upon forward energy transfer per cycle. By providing a reverse boost of energy from the load to the capacitor 20, the effect of initial reverse current flow in the second inductor 24 is a reduction in forward energy transferred during the cycle. Since $I_x$ will become more negative as the average value of load current, $I_{out}$, drops, the amount of charge transferred per cycle will also drop. The result is that, for a given value of load, and all other circuit elements being equal in value, a converter operating in Reverse Boost mode must operate at a higher frequency than a prior art converter.

In FIG. 6, at time $t_1$, current in the effective inductance 114 of FIG. 2B returns to zero and the first switch is turned off. A bidirectional energy transfer cycle now occurs during the time interval $t_1$ to $t_4$, with both the capacitor 20 voltage and the current in the second inductor 24, rising and falling in accordance with a characteristic time scale, $T_2/2$, defined by the capacitance C of capacitor 20 and the inductance L of second inductor 24 ($T_2/2=\pi\sqrt{L\ast C}$). Between time $t_1$ and $t_2$, $I_{out}$ remains negative and energy continues to be transferred from the load to the capacitor 20, with the capacitor 20 voltage peaking at time $t_2$ as $I_{out}$ passes through zero. Between $t_2$ and $t_4$ energy from the capacitor 20 is returned to the load, with $I_{out}$ peaking at time $t_3$ when the capacitor 20 voltage is equal to the load voltage, $V_{out}$. At time $t_4$, the capacitor voltage returns to zero, and the second switch 28 is closed, preventing energy transfer from occurring between the second inductor 24 and the capacitor 20. From time $t_4$ until the initiation of the next cycle, current $I_{out}$ will ramp down linearly in accordance with Equation 8.

When operated in Reverse Boost mode, a converter according to the present invention can operate down to no load without the deleterious effects of "discontinuous" mode. By allowing for reverse current flow in the second inductor 24, while simultaneously asserting control over the amount of forward energy transferred, Reverse Boost eliminates the source of discontinuous mode while at the same time reducing the relative range of frequencies over which the converter will operate as load is decreased. Clearly, reducing the inductance value of the second inductor 24 is not only made possible by Reverse Boost, it is required to ensure that current reversal will occur at light loads.

It is informative to compare the performance of a prior art converter 10 with a converter according to the present invention 50 operating in Reverse Boost mode. Both converters are implemented using identical leakage reactance transformers 14 and capacitors 20, and both are configured to maintain a regulated output voltage, $V_{out}$, of 5 Volts. Performance comparisons are made with both converters operating with a transformed input source voltage, $V_{eg}$, of 6.5 Volts. The value of the equivalent leakage inductance, referenced to the secondary ($L_{2e}$ in FIGS. 1B and 2B), is 37 nanohenries in each converter, and the capacitor 20 is a standard low-loss polypropylene device having a value of 0.44 microfarads. Both converters utilize standard Schottky power diodes for the first unidirectional conducting device 16. The second switching device 28 in the converter according to the present invention is implemented using the topology of FIG. 4. A MOSFET transistor with an on-resistance of approximately 30 milliohms is used for switch 52, and a Schottky diode is used for the unidirectional conducting device 50. In the prior art converter 10, the value, L, of the second inductor 24 is 10 microhenries, while in the converter according to the present invention 50, the inductance value is reduced to 3 microhenries.

In the prior art converter, current reversal in the second inductor 24 starts to appear at an operating frequency of about 140 Kilohertz, as the average output load current is reduced to a value of about 1 Ampere. This is predictable, since, following the end of the energy transfer interval, the value of the current $I_{out}$ will rise and fall in accordance with the characteristic time scale $T_{out}/2 = \pi\sqrt{L*C}$. If the time period between the end of an energy transfer interval and the start of the next operating cycle exceeds the characteristic time scale $T_{out}/2$, then the current in the second inductor at the start of the next operating cycle will be less than its value at the end of the preceding energy transfer interval. Since at light loads the instantaneous value of current, $I_{out}$, flowing in the second inductor 24 at the end of the energy transfer interval is small, current reversal may be anticipated to occur at a converter operating period equal to the sum of the period of the energy transfer interval (in this case 0.4 microseconds) and the characteristic time scale $T_{out}/2$ (in this case, 6.6 microseconds). In this case the anticipated converter operating period at which current reversal will occur is 7 microseconds, corresponding to an operating frequency of 142.8 Kilohertz. Lacking a mechanism for bypassing the flow of the reverse current around the capacitor 20, energy is transferred to the capacitor 20 resulting in a positive voltage appearing across the capacitor at the start of the next energy transfer cycle. The presence of a positive voltage across the capacitor 20 at the start of a cycle will tend to reduce the forward energy transferred during the cycle. On a cycle by cycle basis, the energy transferred per cycle will depend upon the initial voltage on the capacitor 20 which will itself vary from cycle to cycle. The result is a variation in converter operating frequency as the controller attempts to maintain constant forward power flow. As load is reduced further, the converter operating period increases and bidirectional energy transfer between the second inductor 24 and the capacitor 20 occurs during each operating cycle. Besides resulting in a periodic operating mode, the relatively low frequency resonance characteristic of this "discontinuous mode" appears at the output in the form of increased output noise.

In the converter according to the present invention, the discontinuous mode is eliminated since the second switching device 28 prevents reverse energy transfer between the second inductor 24 and the capacitor 20. For the component values previously defined, operation at an average output current of 1 Ampere occurs at a stable converter operating frequency of about 161 Kilohertz. This is higher than the operating frequency of the prior art converter operating at the same load because the value of the second inductor 24 has been reduced, and current reversal in the second inductor (at a value $I_x$ of about 1.8 Amperes) is occurring in the converter according to the present invention at this value of load, resulting in a reduction of forward energy transferred per cycle. No load operation occurs at a converter operating frequency of about 65 Kilohertz, at which frequency the forward power flow just compensates for the losses in the second switch 28 and the other output circuit components (about 1.8 Watts). At this operating frequency, the value of $I_x$ is about 9 Amperes, and the period of the forward energy transfer interval has been reduced to about 0.32 microseconds.

Figure 4:
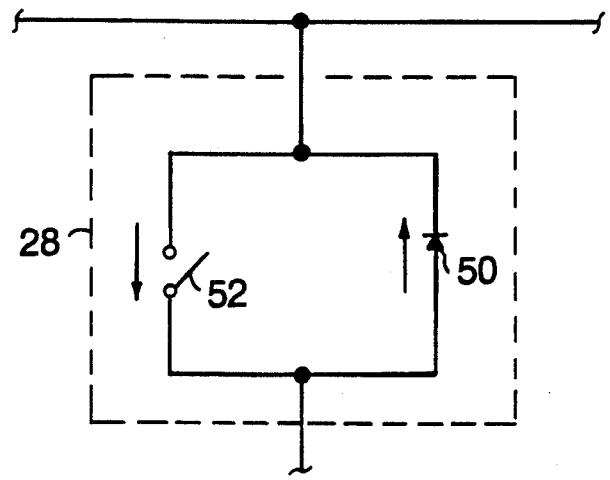
FIG. 4 shows a portion of an alternate embodiment of the zero-current switching converter of FIG. 2.

In its simplest form, Reverse Boost would be implemented by using the circuit of FIG. 4 as the second switch 28 in the converter according to the present invention 50 of FIG. 2A. The value of second inductor 24 would be reduced relative to a prior art converter. The controller 32 would open the unidirectional switch 52 (FIG. 4) at essentially the same time that the first switch 26 was closed, and close the unidirectional switch 52 when the capacitor 20 voltage returned to zero. The variable frequency control circuit of the prior art converter would be used as the control circuit 22 for the first switch. At relatively high loads, the operating frequency would be relatively high, and the current in the second inductor 24 would always flow in a positive direction. Under these conditions, opening the unidirectional switch 52 at essentially the time that the first switch 26 is closed will have no effect on converter behavior-the second unidirectional conducting device 50 of FIG. 4 will carry the positive current Iout ensuring operation as a prior art converter. As load is decreased, a value of load will be reached where current reversal will start to occur in the second inductor 24. The blocking effect of Reverse Boost on forward power flow will start to be asserted, and the rate of decrease of frequency will not occur as rapidly as the rate of decrease of load. Reverse Boost will become a self-regulating process in that the converter operating frequency will stabilize at a value such that the reverse current in the second inductor 24 at the start of a cycle ($I_x$ of Equation 10) is sufficient to maintain the output voltage in regulation at the particular value of load. At no load, the lower limit on operating frequency in the Reverse Boost mode of operation will effectively be dependent upon the small amount of losses present in the circuit elements forming the output circuit. A value of $I_x$ will be reached at which forward power flow will just be sufficient to compensate for output circuit losses.

As demonstrated above, by providing a mechanism for supporting negative flow of current I2, the topology of the present invention may be used to selectively regulate the amount of forward energy transferred during a converter operating cycle, while simultaneously regulating reverse energy transfer from energy storing elements in the load to the capacitor 20. Elimination of the "discontinuous" operating mode at low values of load, and reduction in the range of frequencies over which the converter operates as load is reduced, are two of the resulting benefits. Through use of an appropriate controller 32 (which may be a part of control circuit 22), and correspondingly appropriate values of the circuit elements, many possible converter operating modes can be realized which exploit this mechanism. Thus, in the simplest case, discussed above, Reverse Boost might be used solely to eliminate the discontinuous mode at light loads while raising the minimum converter operating frequency. Other controller implementations might utilize the topology of the present invention to assert Reverse Boost at light loads and Forward Boost at higher values of load. This could further reduce the operating frequency range of the converter while providing other benefits, discussed above.

By providing a mechanism for supporting and controlling the effects of negative current flow in the second inductor 24 (i.e. for supporting reverse energy flow from the load toward the switch 28), the converter according to the present invention may be adapted to provide a multitude of independent outputs, each one of which will remain in regulation as loads on the various outputs are varied. In an alternate embodiment of the converter of the present invention 50, FIG. 2A, the second inductor 24 is replaced with the circuit arrangement shown in FIG. 9. In the Figure, a second inductor 224 is modified to incorporate a multitude of auxiliary windings 226. Each auxiliary winding 226 is connected in series with a unidirectional conducting device 250, and the parallel combination of a filter capacitor 261, and a load (the loads being represented as load voltages $Vl_1$, $Vl_2$, ...), the unidirectional conducting devices 250 being oriented to conduct when the capacitor voltage 20 goes essentially to zero and the main regulated output voltage, $V_{out}$, is impressed in reverse across the main winding 225 of the second inductor 24. The voltages generated by the auxiliary windings 226 $V_{o1}$, $V_{o2}$, ..., will be related to the main output voltage, $V_{out}$, by the ratio of the number of turns on any particular auxiliary winding 226, $N_2$, to the number of turns on the main winding 225, $N_1$. It should be noted that maintaining the auxiliary output voltages in fixed ratio to the main output voltage depends upon maintaining the capacitor 20 voltage at zero throughout the time period during which energy is being transferred to the auxiliary loads (i.e. so that the voltage impressed in reverse across the main winding 225 of the second inductor 224 remains fixed at $V_{out}$). If the prior art converter 10 of FIG. 1A were adapted in accordance with FIG. 9, maintaining the various auxiliary outputs in regulation would require that a minimum load always be present on the main output. This is because the second unidirectional conducting device 18 (FIG. 1A) will only maintain the capacitor voltage at zero if positive current is flowing in the second inductor 24 throughout the time period during which energy is being transferred to the auxiliary loads. Said another way, in a prior art converter, energy available for transfer to the auxiliary loads is limited to the energy which is stored in the second inductor 224 at the point in time at which the capacitor 20 voltage returns to zero. Therefore, in a prior art converter adapted per FIG. 9, a minimum load must be maintained on the main output to ensure that sufficient energy is always available in the second inductor 224 to supply energy to the various auxiliary outputs under conditions of maximum load. In a converter according to the present invention, adapted per FIG. 9, this minimum load condition does not exist. Because closure of the second switch 28, of FIG. 2A, at the time when the capacitor 20 voltage returns to zero allows maintaining the capacitor 20 voltage at zero even after current in the main winding 225 of the second inductor 224 reverses, energy transferred to the various auxiliary loads is not limited to the magnetic energy stored in the second inductor 224 but may also be sourced from energy storage elements which form part of the main output load (i.e. filter capacitors). Thus, the present invention allows a multitude of auxiliary output voltages to be maintained in fixed ratio to the main output voltage, as loads on the various outputs are independently varied, and without requiring that a minimum load be maintained on the main converter output.

The multiple output embodiment of the converter according to the present invention, as described in the preceding paragraph, is useful in many practical applications, but has characteristics which can create difficulties in others. Although the various auxiliary output voltages, $V_{o1}$, $V_{o2}$, ..., (FIG. 9) are in fixed ratio to the main output voltage, $V_{out}$, during the period of time that the unidirectional conducting devices 250 are conducting current (assuming perfect coupling between the auxiliary winding 226 and the main winding 225), the voltages delivered to the loads, $V_{L1}$, $V_{L2}$, ..., will be reduced in value by the voltage drop across the unidirectional conducting devices 250. For example, the voltage $V_{L1}$ will be equal to:

$$VL1 = Vol - Vd \qquad (14)$$

where, $$Vol = \frac{N2}{N1} \cdot Vout. \qquad (15)$$

Figure 9:
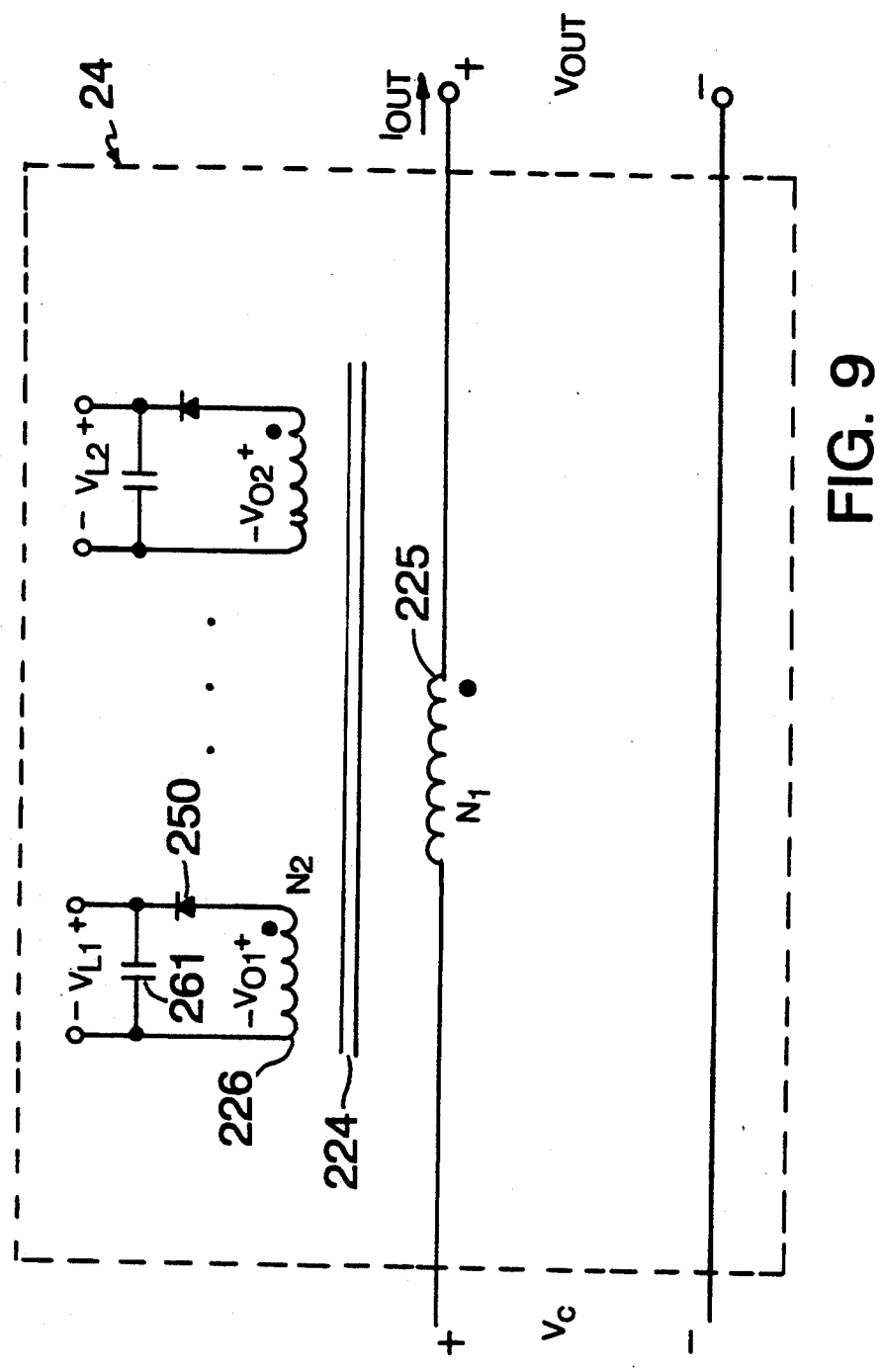
FIG. 9 is a schematic of an alternate embodiment of a portion of the converter circuit of FIG. 2 showing a method for generating a multitude of regulated voltage outputs, all of which can be maintained in regulation as the loads on the various outputs vary independently.

In equations 14 and 15, $N_2$ is the number of turns on the auxiliary winding 226, $N_1$ is the number of turns on the main winding 225, and $V_d$ is the voltage drop across the unidirectional conducting device 250. A similar equation would apply for each of the other auxiliary outputs. Several difficulties are apparent from examination of Equations 14 and 15:

since the number of turns, $N_1$ and $N_2$, can only have integer values, and since very large values of either $N_1$ or $N_2$ are impractical, the range of allowable values of $V_{o1}$ (and therefore $V_{L1}$) is not continuous; the value of voltage drop in the unidirectional conducting device 250, $V_d$, will vary from device to device, and will also vary with changes in load and temperature. Thus, there is a limit to the degree to which an auxiliary output can be regulated. Furthermore, this limitation becomes more severe as the desired value of $V_{L1}$ gets smaller since the relative contribution of the effect of variations in $V_d$ is increased; equation 15 assumes perfect coupling between the auxiliary winding 226 and the main winding 225. While very tight magnetic coupling between windings can be achieved in practice, tight coupling implies low values of leakage inductance. When energy transfer to the auxiliary loads via the auxiliary windings 226 commences, a discontinuity occurs in the flow of current Iout (FIG. 9). Tightly coupled windings and low leakage inductance will result in relatively high rates of change of current when energy transfer begins. This puts high stresses on both the unidirectional conducting devices 250 and the capacitors 261, and can produce high frequency radiated and conducted noise. Looser coupling will result in relatively lower component stresses and current rise time, but will also result in higher leakage inductance and alteration in the value of Vol (i.e. Equation 15 and 14 will no longer apply).

The difficulties defined above are most significant where low voltage auxiliary outputs are desired; if relatively high power must be supplied to an auxiliary load; or if many different auxiliary output voltages, $V_{L1}$, $V_{L2}$, ... $V_{Ln}$, are needed (because of the difficulty of having to simultaneously satisfy both the different relative turns ratios and compensate for the drops in the unidirectional conducting devices 250).

Figure 10:
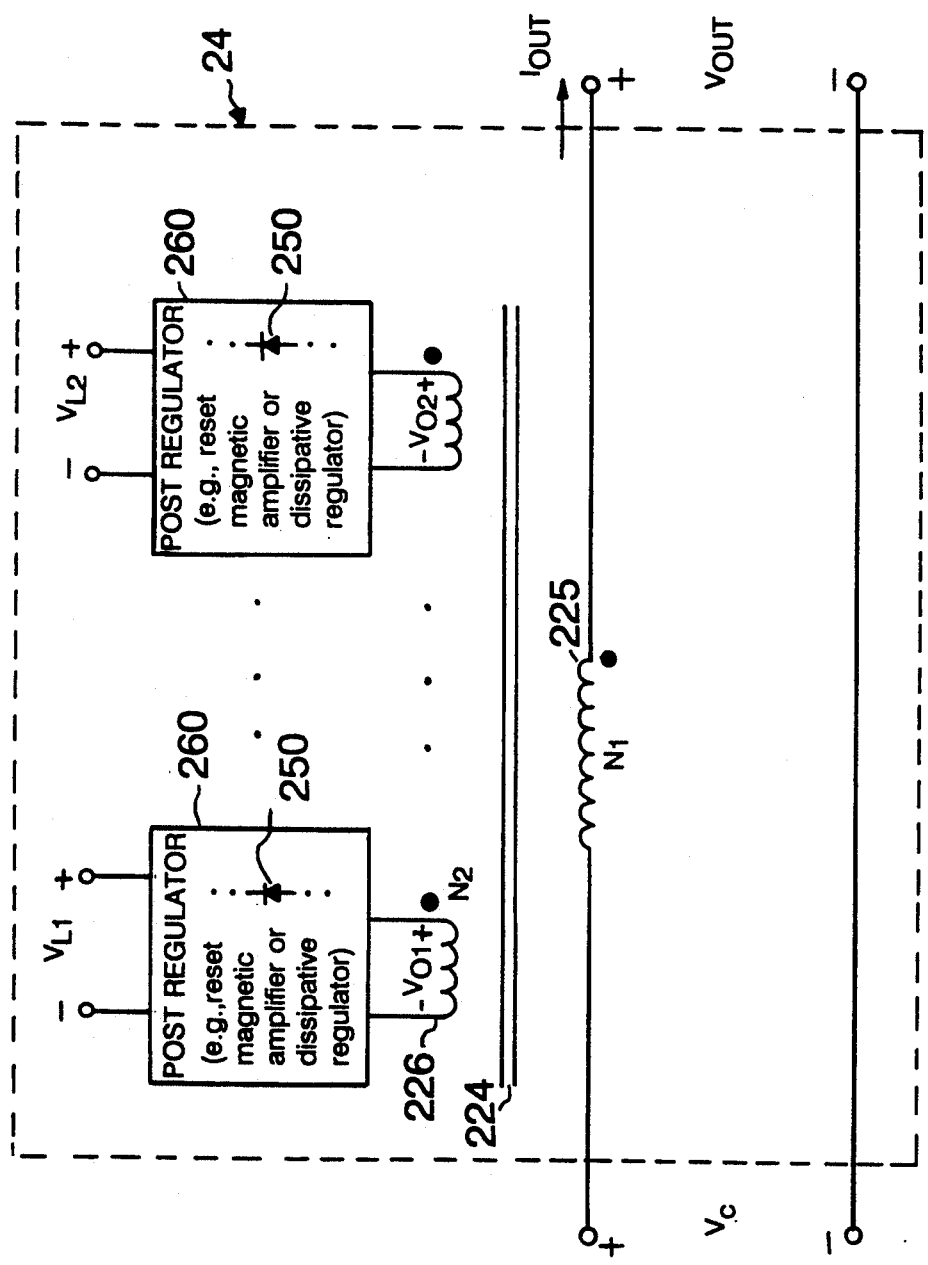
FIG. 10 is a schematic of an alternate embodiment of a portion of the converter circuit of FIG. 2 showing a method for generating a multitude of regulated voltage outputs all of which can be maintained in regulation as the loads on the various outputs vary independently, and which is more universally applicable than the embodiment of FIG. 9.

To overcome the difficulties described above, the second inductor 24 of FIG. 9 can be constructed to ensure that a small amount of effective leakage inductance was present in all of the secondary windings 226 (i.e. a "loosely coupled second-inductor" would be constructed). The relative turns ratios of each of the auxiliary windings 226 on the loosely coupled second-inductor 224 would be selected to ensure that the voltage outputs of the secondary windings 226 $V_{o1}$, $V_{o2}$, ..., are greater than the values of the regulated voltages $V_{L1}$, $V_{L2}$, ..., desired at the loads. As shown in FIG. 10, each auxiliary load (represented by the load voltages $V_{L1}$, $V_{L2}$, ...) would be connected to one of the secondary windings 226 via a post-regulator 260 which would reduce the average value of each secondary voltage $V_{o1}$, $V_{o2}$, ..., to the desired value of load voltage $V_{L1}$, $V_{L2}$, .... Although each post-regulator 260 would incorporate a unidirectional conducting device 250 in the series path between the secondary winding 226 and the load, the specific placement of the unidirectional conducting device would depend on the specific post-regulation method chosen. A preferred embodiment of the post-regulator would be a reset magnetic amplifier (followed by a storage capacitor) which would perform the regulation function in an essentially lossless fashion. In this case, the simplest topology for the magnetic amplifier would incorporate a unidirectional conducting device 250 at the load side of the post-regulator 260, with a resettable inductor in series with, but interposed between, the secondary widing 226 and the unidirectional conducting device 250. Alternatively, for relatively low power outputs, post regulation can be achieved through use of a dissipative post-regulator 260 either with a storage capacitor at both its input and output, or with a storage capacitor at its output only. In these cases, the unidirectional conducting devices would be connected directly to the secondary windings 226 at the input side of the post-regulators 260.

In the preceding discussion a topological enhancement to a prior art zero-current-switching forward converter has been described. The topology of the present invention provides a mechanism for implementing new converter operating modes (Forward Boost and Reverse Boost) which overcome many characteristic limitations of the prior art topology. It is worthwhile to consider the relative benefits of both Forward and Reverse Boost within the contexts of contemporary component technology and current power systems architecture:

Reverse Boost combines simplicity in implementation with a universally desirable set of benefits: elimination of the discontinuous operating mode at light loads, reduction in the range of converter operating frequency as load is varied, the ability to generate multiple outputs without a minimum load being required on any one output, and reduction in size of the second inductor.

A very useful and desirable feature of the prior art converter topology 10, FIG. 1A, is that a multitude of similar converters may be operated in parallel, in synchronized arrays, where all converters inherently, and dynamically, share an equal portion of the power delivered to the load (i.e. as in Vinciarelli, "Power Booster Switching at Zero Current", U.S. Pat. No. 4,648,020, issued Mar. 3, 1987, assigned to the same assignee as this application, and incorporated herein by reference). In parallel arrays composed of converters according to the present invention 50, FIG. 2A, accuracy in power sharing between converters will, in part, be dependent upon the relative timing of the opening of the second switch 28 in each converter in the array. This would be a particular problem when the converters in the array are configured to operate in Forward Boost mode. In such an array, accurate power sharing will depend upon all converters exhibiting the same amount of boost time (i.e. the time span from time $t_0$ to time $t_1$ in FIGS. 3A–3D). Differences in boost time between converters will produce differences in forward energy transferred during each cycle by each converter in the array. Furthermore, because the current $I_1$ flowing in the effective inductance 114 (FIGS. 2B and 3C) at the time that the second switch 28 is opened is linearly dependent upon boost time, and the energy stored in the effective inductance is proportional to the square of the current, the relative energy transferred per cycle in any two converters in an array will be first-order dependent upon the square of the ratio of the boost times in the two converters. With contemporary MOSFET switches exhibiting practical switching speeds in the tens of nanoseconds, and with boost times typically ranging from several tens of nanoseconds to the low hundreds of nanoseconds, the switches themselves will limit the accuracy of current sharing in the array. Furthermore, precise equality in response of the Forward Boost controllers would be difficult to achieve, and this would further mitigate against accurate power sharing. Within the context of contemporary component technology, accurate power sharing between Forward Boost converters operating in parallel arrays would require that their respective second switching devices 28 be synchronized, which, though possible, would not be a generally desirable characteristic. Alternatively, complex circuits, trimmed to exhibit precise Forward Boost control characteristics, could be implemented—also undesirable from cost and repeatability standpoints.

Arrays composed of converters according to the present invention, wherein each converter is configured to operate in Reverse Boost mode, will not suffer from the problem discussed above. At relatively high values of load, all the converters in the array will operate as prior art converters, the second switch 28 will not be a factor in forward energy transferred, and all converters will exhibit prior art power sharing characteristics. As load is decreased and Reverse Boost is asserted, the relative effect of the switching speed of the second switching device 28, in FIG. 2, will be essentially insignificant. Because of the relatively slow rate of change of current Iout at time $t_0$ (FIG. 6D), a few tens of nanoseconds difference between time of closure of the first switch 26 and time of opening of the second switch 28 will not significantly affect the value of reverse current $I_x$. Said another way, energy transfer per cycle in different converters in an array will not be significantly affected by small differences in response times of their respective second switches 28, when the converters are configured to operate in Reverse Boost mode.

Forward Boost allows for constant frequency operation, but requires that the turns ratio of the leakage inductance transformer 14, FIG. 2A, be made sufficiently large so that at the maximum anticipated value, Vin, of the input source 12, the transformed source voltage (($N_2/N_1$)*$V_{in}$) remains less than the desired value of regulated output voltage $V_{out}$. This ensures that Forward Boost is always active as the means of output voltage regulation. Within the context of contemporary magnetic component technology, this can create difficulties if a combination of high power output, high input voltage, and low output voltage are desired. For example, a 5 Volt output converter, which must operate with an input voltage of 350 VDC (not atypical of the rectified high line voltage from a 220 Volt line), would require a transformer turns ratio in excess of 70:1. This is not impossible, but it is difficult to implement in a small size, with low losses, at high power levels.

In the final analysis, Reverse Boost is a preferred operating mode because of its simplicity and universality of application. Within the context of contemporary component technology, Forward Boost is most useful where transient power boost may be required, where it can provide temporary operation during conditions of low input operating voltage, or for constant frequency operation at lower power levels. As component technology continues to improve, broader applicability of the Forward Boost mode can be anticipated.

It should also be noted that while the topology of the present invention 50 provides a mechanism for overcoming many of the characteristic limitations of the prior art topology 10, it does so without sacrificing the prior art topology's inherently low loss characteristic. Avoidance of switching losses is retained in the present invention: the first switch 26 of FIG. 2 is switched on and off at zero-current, while the second switching device 28 is operated in a "zero-voltage switching" mode (i.e. at the times at which it is cycled on and off, the voltage across it is zero and cannot change instantaneously due to the presence of the capacitor 20 across it).

Other embodiments are within the following claims.

What is claimed is:

1. A zero-current switching forward converter circuit comprising:
   a voltage source;
   a power transformer including a primary and a secondary winding, said power transformer being constructed to have an effective secondary leakage inductance L2e;
   a first switching device connected to selectively couple said power source across the primary winding of said power transformer;
   a first unidirectional conducting device connected in series with said secondary winding and oriented to conduct during conduction by said first switching device;
   a capacitor of capacitance C connected in series with said secondary winding and said first unidirectional conducting device; a controller having
   means for selectively closing and opening said first switching device to transfer power from said voltage source via the effective leakage inductance of said transformer to charge said capacitance during an energy transfer cycle having a characteristic time scale of pi*sqrt($L_{2e}$*C),
   means for determining when current in said first switching device is substantially zero, and
   means for causing said first switching device to open at times when current in said first switching device is determined to be substantially zero; and
   a second switching device connected on the secondary side of said transformer;
   said controller including a second control means for opening and closing said second switching device to selectively govern the amount of energy transferred during said energy transfer cycle.

2. The converter of claim 1 wherein said second switching device is connected to prevent charging of said capacitor when said second switching device is closed.

3. The converter circuit of claim 1 or 2 wherein said second switching device is connected in parallel with said capacitor.

4. The converter circuit of claim 3 further adapted to supply power to a load and further comprising an inductor connected in series between said capacitor and the load to deliver current to the load.

5. The converter circuit of claim 4 wherein said second control means comprises
   means for detecting closure of said first switching device;
   means for opening said second switching device at substantially the same time that said first switching device is closed.

6. The converter circuit of claim 5 wherein said second control means further comprises
   means for detecting voltage across said capacitor;
   means for closing said second switching device when voltage across said capacitor is substantially zero.

7. The converter circuit of claim 3 adapted for delivering power to two or more independent loads comprising
   a primary inductor connected in series with said capacitor and one of said independent loads;
   a plurality of secondary windings magnetically coupled to said primary inductor, said secondary windings respectively having relative number of turns that correspond to the relative voltages to be delivered respectively to said independent loads.

8. The converter circuit of claim 7 wherein each said secondary winding is connected to one of said independent loads via a subcircuit that includes a secondary unidirectional conducting device oriented to conduct current when the voltage across said primary inductor is positive in a direction between said load and said capacitor.

9. The converter circuit of claim 8 wherein each said subcircuit includes a filter element for smoothing the voltage across said independent load.

10. The converter circuit of claim 9 wherein said filter element comprises a capacitor in parallel with said load.

11. The converter circuit of claim 8 wherein each said subcircuit comprises a post-regulator for regulating the voltage delivered to said independent load.

12. The converter circuit of claim 11 wherein each said secondary winding is loosely magnetically coupled to said primary inductor.

13. The converter circuit of claim 11 wherein said post-regulator comprises a reset magnetic amplifier.

14. The converter circuit of claim 11 wherein said post-regulator comprises a dissipative regulator.

15. The converter circuit of claim 3 wherein said second switching device comprises
a switch capable of unidirectional conduction when closed, and
a second unidirectional conduction device,
said switch and said unidirectional conduction device being connected in parallel and oriented to conduct in opposite directions.

16. The converter circuit of claim 15 wherein said second switching device is oriented so that said unidirectional conduction device will prevent charging of said capacitor when current flowing in said second inductor is in a direction towards the load.

17. The converter circuit of claim 1 wherein said second switching device is connected in parallel with the secondary winding of said power transformer.

18. The converter circuit of claim 17 further comprising
a second unidirectional conducting device connected in parallel with said capacitor and oriented to prevent charging of said capacitor when current flowing in said second inductor is in a direction toward a load.

19. The converter circuit of claim 18 further adapted to accept a load and further comprising an inductor connected in series between said capacitance and the load to deliver current to the load.

20. The converter circuit of claim 4, wherein said second control means comprises
means for detecting closure of said first switching device, and
means for opening said second switching device at a selected time thereafter.

21. The converter circuit of claim 20 wherein said second control means further comprises
means for detecting voltage across said capacitor, and
means for closing said second switching device when voltage across said capacitor is substantially zero.

22. A method of controlling the converter circuit of claim 4 in a reverse boost mode, said method comprising
causing said selective closing and opening of said first switching device, and
closing said second switching device when the voltage across said capacitor is substantially zero to prevent reverse current in said inductor from transferring energy to said capacitor.

23. The method of claim 22 further comprising opening said second switching device at substantially the same time that said first switching device is closed.

24. The method of claim 23 further comprising varying the frequency at which said first switch is opened and closed to effect output voltage regulation.

25. A method of controlling the converter circuit of claim 4 to operate in a forward boost mode, said method comprising
causing said selective closing and opening of said first switching device, and
holding said second switching device closed for a selected period of time after said first switching device has been closed.

26. The method of claim 25 further comprising closing said second switching device when voltage across said capacitor is substantially zero.

27. The method of claim 26 further comprising
varying the frequency at which said first switch is opened and closed to effect output voltage regulation when the ratio of the value of said voltage source to the value of the output voltage of the converter is greater than the ratio of the number of turns on the primary of said power transformer to the number of turns on the secondary of said power transformer.

28. The method of claims 27 further comprising
controlling the time period during which the second switching device remains closed so as to maintain the output voltage of the converter circuit in regulation irrespective of the relative values of said voltage source and said output voltage.

29. A method of controlling the converter circuit of claim 4, wherein the ratio of the number of turns on the primary of said power transformer to the number of turns on the secondary of said power transformer is greater than the ratio of the maximum value of said voltage source to the value of the output voltage of the converter, to operate in a forward boost mode, said method comprising
causing said selective closing and opening of said first switching device, and
holding said second switching device closed for a selected period of time after said first switching device has been closed.

30. The method of claim 29 further comprising closing said second switching device when voltage across said capacitor is substantially zero.

31. The method of claim 30 further comprising
controlling the opening and closing of said first switching device to occur at a constant frequency.

32. The method of claim 31 further comprising
controlling the time period during which the second switching device remains closed so as to maintain the output voltage of the converter circuit in regulation.

33. The method of claim 28 wherein said voltage source has a possibly varying voltage level, and
said second switching device is opened when the level of said current flowing in said first unidirectional conduction device rises to become equal to the level of current flowing in the direction of the load in said second inductor so long as said voltage level does not fall below a predetermined value, and is otherwise controlled to stay closed for a longer time period to maintain said output voltage of the converter circuit in regulation.

34. The method of claim 28 further comprising
controlling the opening and closing of said first switching device to occur at frequencies within a predetermined frequency band.

35. A method for use with a zero-current switching forward converter of the kind comprising:
a voltage source;
a power transformer including a primary and a secondary winding, said power transformer being constructed to have an effective secondary leakage inductance $L_{2e}$;

a first switching device connected to selectively couple said power source across the primary winding of said power transformer;

a first unidirectional conducting device connected in series with said secondary winding and oriented to conduct during conduction by said first switching device;

a capacitor of capacitance C connected in series with said secondary winding and said first unidirectional conducting device;

a controller for selectively operating said first switching device; and a second switching device connected on the secondary side of said transformer;

said method comprising determining when current in said first switching device is substantially zero;

causing said controller to selectively close and open said first switching device to transfer power from said voltage source via the effective leakage inductance of said transformer to charge said capacitance during an energy transfer cycle having a characteristic time scale of pi*sqrt ($L_{2e}$*C), said first switching device being opened at times when current in said first switching device is determined to be substantially zero; and opening and closing said second switching device to selectively govern the amount of energy transferred during said energy transfer cycle.

36. A zero-current switching forward converter circuit comprising:

a voltage source;

a power transformer including a primary and a secondary winding, said power transformer being constructed to have an effective secondary leakage inductance $L_{2e}$;

a first switching device connected to selectively couple said power source across the primary winding of said power transformer;

a first unidirectional conducting device connected in series with said secondary winding and oriented to conduct during conduction by said first switching device;

a capacitor of capacitance C connected in series with said secondary winding and said first unidirectional conducting device;

means for determining when current in said first switching device is substantially zero; and a controller having means for selectively closing and opening said first switching device to transfer power from said voltage source via the effective leakage inductance of said transformer to charge said capacitance during an energy transfer cycle having a characteristic time scale of pi*sqrt ($L_{2e}$*), said controller causing said first switching device to open at times when current in said first switching device is determined to be substantially zero;

a second switching device connected on the secondary side of said transformer and in parallel with said capacitor to prevent charging of said capacitor when said second switching device is closed; and an inductor connected in series between said capacitor and the load to deliver current to the load;

said controller including a second control means for opening and closing said second switching device to selectively govern the amount of energy transferred during said energy transfer cycle.

37. The method of controlling the converter circuit of claim 8 in a reverse boost mode, said method comprising causing said selective closing and opening of said first switching device, and closing said second switching device when the voltage across said capacitor is substantially zero to prevent reverse current in said inductor from transferring energy to said capacitor.

38. The method of controlling the converter circuit of claim 11 in a reverse boost mode, said method comprising causing said selective closing and opening of said first switching device, and closing said second switching device when the voltage across said capacitor is substantially zero to prevent reverse current in said inductor from transferring energy to said capacitor.

39. The method of controlling the converter circuit of claim 16 in a reverse boost mode, said method comprising causing said selective closing and opening of said first switching device, and closing said second switching device when the voltage across said capacitor is substantially zero to prevent reverse current in said inductor from transferring energy to said capacitor.

40. A method of controlling the converter circuit of claim 16 to operate in a forward boost mode, said method comprising causing said selective closing and opening of said first switching device, and holding said second switching device closed for a selected period of time after said first switching device has been closed.

41. A method of controlling the converter circuit of claim 19 to operate in a forward boost mode, said method comprising causing said selective closing and opening of said first switching device, and holding said second switching device closed for a selected period of time after said first switching device has been closed.

42. A method of controlling the converter circuit of claim 16, wherein the ratio of the number of turns on the primary of said power transformer to the number of turns on the secondary of said power transformer is greater than the ratio of the maximum value of said voltage source to the value of the output voltage of the converter, to operate in a forward boost mode, said method comprising causing said selective closing and opening of said first switching device, and holding said second switching device closed for a selected period of time after said first switching device has been closed.

43. A method of controlling the converter circuit of claim 19, wherein the ratio of the number of turns on the primary of said power transformer to the number of turns on the secondary of said power transformer is greater than the ratio of the maximum value of said voltage source to the value of the output voltage of the converter, to operate in a forward boost mode, said method comprising causing said selective closing and opening of said first switching device, and holding said second switching device closed for a selected period of time after said first switching device has been closed.

44. The converter circuit of claim 12 wherein said post-regulator comprises a reset magnetic amplifier.

45. The converter circuit of claim 12 wherein said post-regulator comprises a dissipative regulator.

46. The converter circuit of claim 16 wherein said second control means comprises
   means for detecting closure of said first switching device, and
   means for opening said second switching device at a selected time thereafter.

47. The converter circuit of claim 19 wherein said second control means comprises
   means for detecting closure of said first switching device, and
   means for opening said second switching device at a selected time thereafter.

48. The method of claim 37 further comprising
   opening said second switching device at substantially the same time that said first switching device is closed.

49. The method of claim 38 further comprising
   opening said second switching device at substantially the same time that said first switching device is closed.

50. The method of claim 39 further comprising
   opening said second switching device at substantially the same time that said first switching device is closed.

51. The method of claim 40 further comprising
   closing said second switching device when voltage across said capacitor is substantially zero.

52. The method of claim 41 further comprising
   closing said second switching device when voltage across said capacitor is substantially zero.

53. The method of claim 42 further comprising
   closing said second switching device when voltage across said capacitor is substantially zero.

54. The method of claim 43 further comprising
   closing said second switching device when voltage across said capacitor is substantially zero.

55. The method of claim 31 further comprising
   controlling the opening and closing of said first switching device to occur at frequencies within a predetermined frequency band.

* * * * *